United States Patent
Johannesson et al.

(10) Patent No.: US 9,215,858 B2
(45) Date of Patent: Dec. 22, 2015

(54) CABINET IN A MILKING PARLOUR

(75) Inventors: Leif Johannesson, Tullinge (SE);
Mikael Källman, Bromma (SE)

(73) Assignee: DELAVAL HOLDING AB, Tumba (SE)

( * ) Notice: Subject to any disclaimer, the term of this patent is extended or adjusted under 35 U.S.C. 154(b) by 386 days.

(21) Appl. No.: 13/819,806

(22) PCT Filed: Sep. 5, 2011

(86) PCT No.: PCT/SE2011/051069
§ 371 (c)(1),
(2), (4) Date: Feb. 28, 2013

(87) PCT Pub. No.: WO2012/033448
PCT Pub. Date: Mar. 15, 2012

(65) Prior Publication Data
US 2013/0152861 A1    Jun. 20, 2013

(30) Foreign Application Priority Data

Sep. 7, 2010 (SE) ..................................... 1050918

(51) Int. Cl.
*A01J 5/00* (2006.01)
*A01J 7/00* (2006.01)
*A01J 5/017* (2006.01)
*B65G 1/00* (2006.01)

(52) U.S. Cl.
CPC .. *A01J 7/00* (2013.01); *A01J 5/017* (2013.01); *B65G 1/00* (2013.01)

(58) Field of Classification Search
CPC ........... A01J 5/017; A01J 5/0175; A01J 5/00; A01J 7/00; A01J 9/08; A01J 7/025; A01J 7/022; A01K 1/12; A01K 1/123; A01K 1/126

USPC ...................... 119/14.18, 14.03, 14.45, 14.01
See application file for complete search history.

(56) References Cited

U.S. PATENT DOCUMENTS 6,336,424 B1    1/2002    Kullberg et al.
6,357,387 B1    3/2002    Johannesson
(Continued)

FOREIGN PATENT DOCUMENTS

CN        1951125 A    4/2007
WO        99/07212     2/1999
(Continued)

OTHER PUBLICATIONS

International Search Report dated Apr. 3, 2012, corresponding to PCT/SE2011/051069.
(Continued)

*Primary Examiner* — Joshua Huson
(74) *Attorney, Agent, or Firm* — Young & Thompson

(57) ABSTRACT

A teat cup magazine (1), arranged to store at least two teat cups (3), includes a removing device for each teat cup (3), which is arranged to retract the teat cup (3) into the teat cup magazine when a milking process has finished. Each removing device includes a cylinder (8) and a piston (9). The cylinders (8) of the removing devices are formed by at least one cylinder profile (35, 38, 39), manufactured in one piece, which constitutes the sole load-bearing structure of the teat cup magazine. The at least one cylinder profile (35, 38, 39) includes on one side, integrated attachment zones (37) for attaching milking components, and on an opposite side, a guiding track (13) for each cylinder (8), adapted for a movable guiding element (6) supporting a milk tube (4) and a pulse tube (5) connected to the teat cup.

20 Claims, 5 Drawing Sheets

(56) References Cited

U.S. PATENT DOCUMENTS

| | | |
|---|---|---|
| 6,814,224 B2 | 11/2004 | Garbagnati |
| 7,762,405 B2 | 7/2010 | Vogel et al. |
| 2005/0072363 A1 | 4/2005 | van der Lingen et al. |

FOREIGN PATENT DOCUMENTS

| | | |
|---|---|---|
| WO | 02/15676 | 2/2002 |
| WO | 03/087586 | 10/2003 |
| WO | 2005/094566 | 10/2005 |

OTHER PUBLICATIONS

Supplementary International Search Report dated Nov. 15, 2012, corresponding to PCT/SE2011/051069.

Syrovatka, et al.; Avtomatizirovannoe Oborudovanie Molochnykh ferm. M., Rosagropromizdat, 1989, pp. 17-24.

Chinese Office Action, dated Jan. 23, 2014, from corresponding CN application.

CABINET IN A MILKING PARLOUR

BACKGROUND OF THE INVENTION AND PRIOR ART

The present invention relates to a teat cup magazine arranged to store at least two teat cups when they are not used, comprising a removing device for each teat cup, arranged to retract the teat cup into the teat cup magazine when a milking process has finished, wherein each removing device comprises a cylinder and a piston.

A teat cup magazine provided with removing devices for the teat cups is often designed as a cabinet with an inner space where the removing devices are mounted together with sensitive milking components. Sensitive milking components may, for example, be electric components, valves, and measuring equipment used in connection with the milking processes in a milking parlour. Such teat cup magazines are often complicated structures, which are time consuming and expensive to manufacture.

During installation, repair or servicing of milking components in such a teat cup magazine, it is necessary to open or remove a door element of the cabinet. Such a door element may be mounted by means of hinges or the like at an edge portion of the door element. In milking parlours there are many times a lot of components in the vicinity of the cabinet. The presence of these components may make it difficult to swing the door of the cabinet to an open position and to obtain sufficient space for installation, repair or servicing of the milking components.

SUMMARY OF THE INVENTION

The object of the present invention is to provide a teat cup magazine which is cheaper and easier to manufacture. This object is achieved by the teat cup magazine initially defined, characterized in that the cylinders of the removing devices are formed by at least one cylinder profile, manufactured in one piece, which constitutes the sole load-bearing structure of the teat cup magazine. The cylinder profiles comprise on one side integrated attachment zones for attaching milking components, and on the other side a guiding track for each cylinder, adapted for a movable guiding element supporting a milk tube and a pulse tube connected to the teat cup. Such a guiding element may be slidably arranged in the guiding track of the cylinder profile in order to perform a well controlled removing motion of the teat cup.

Preferably, the guiding track has an extension along the whole length of the cylinder. In this case, the cylinder profile may be given a constant cross-section and be manufactured by means of an extrusion process. The cylinder profile may comprise one, two or four cylinders. A teat cup magazine usually stores four teat cups; In this case, one, two or four such cylinder profiles may be used in the teat cup magazine. The cylinder profiles may be manufactured by a material such as aluminium. By means of one or several such cylinder profiles, the teat cup magazine may be manufactured at a relatively low cost.

According to an embodiment of the invention, the teat cup magazine further comprises a cabinet which is attached to the integrated attachment zones of the at least one cylinder profile.

In a preferred embodiment, the cabinet comprises a door element facilitating installation, repair or servicing of milking components arranged in an inner space of the teat cup magazine. Such a door element may comprise two pivoting mechanisms allowing a swingable motion around two different pivot axes. These pivoting mechanisms will keep the door element in a closed position. In case the first pivoting mechanism is disconnected by means of said opening mechanism, it is possible to swing the door element around the second pivot axis by means of the second pivoting mechanism. In case the second pivoting mechanism is disconnected by means of said opening mechanism, it is possible to swing the door element around the first pivot axis by means of the first pivoting mechanism. In case both the first pivoting mechanism and the second pivoting mechanism are disconnected by means of said opening mechanism, it is possible to remove the door element completely from the cabinet. The disconnection of at least one of the pivoting mechanisms results in different kinds of motions for opening or removing the door element from the cabinet. A serviceman in the milking parlour has here the possibility to choose the simplest way to open or remove the door element in view of the free space around the cabinet in the milking parlour. This possibility facilitates installation, repair or servicing of the milking components arranged in the cabinet.

According to an embodiment of the invention, said opening mechanism comprises at least one first grip member allowing disconnection of the first pivoting mechanism and at least one second grip member allowing disconnection of the second pivoting mechanism. In this case, separate grip members are used for disconnecting the first pivoting mechanism and the second pivoting mechanism. The first grip member may be arranged on the outside of the door element, in the vicinity of the first pivoting mechanism, and the second grip member may be arranged on the outside of the door element, in the vicinity of the second pivoting mechanism. In this way it becomes easy for an operator to know which grip member to use when a selected pivoting mechanism is to be disconnected.

According to an embodiment of the invention, the first pivoting mechanism and the second pivoting mechanism are arranged in a manner such that the first pivot axis and the second pivot axis are parallel. In this way the first pivoting mechanism and the second pivoting mechanism may allow a swinging motion of the door element around two different vertical pivot axes at a distance from each other. Alternatively, the first pivoting mechanism and the second pivoting mechanism may allow a swinging motion of the door element around two different horizontal pivot axes. Preferably, the first pivoting mechanisms and the second pivoting mechanisms may be arranged at two edge portions of the door element, allowing the door element to swing around the first pivot axis at a first edge portion and around the second pivot axis at a second edge portion. The first pivoting mechanisms and the second pivoting mechanisms may be arranged at two edge portions on opposite sides of the door element.

According to an embodiment of the invention, at least one of said pivoting mechanisms comprises two concentrically arranged rod elements connected to the door element and two concentrically arranged holes in stationary parts of the cabinet, wherein each hole is arranged to receive an end portion the rod elements. The holes may be arranged in the cabinet on opposite sides of the door element. Said at least one pivoting mechanism may comprise resilient means arranged to displace said rod elements into engagement with the respective holes by means of a resilient force. Thereby, the rod elements will be automatically moved into engagement with the respective holes when the door element is placed in the closed position. The resilient means may be a single spring member mounted in a space between the two rod elements.

According to an embodiment of the invention, said opening mechanism comprises a grip member for each rod element, by which it is possible to displace the respective rod elements out of engagement with the holes against the action of the resilient means. In this case, four grip members are to be used. One pair of grip members may be placed on one side of the door element and one pair of grip members may be placed on an opposite side of the door element. The rod elements may be displaceably arranged on an inside of the door element and each grip member may be connected to a respective rod element by means of a pin element having an extension trough an opening in the door element. It is here possible to give the rod elements on the inside of the door element a corresponding motion as the grip members on the outside of the door element.

According to an embodiment of the invention, the opening in the door element has an elongated design such that it possible to displace the two grip members towards each other in order to move the two rod elements out of engagement with the holes. The two grip members may be arranged at a smaller distance than 15 cm from each other, preferably at a distance of 5 to 10 cm, when the rod elements are in engagement with the respective holes. In this case, it is possible for an operator to grip the grip members with one hand and press the grip members together with the thumb and the forefinger in order to move the two rod elements out of engagement with the holes. It is very easy for an operator to disconnect a selected pivoting mechanism of the door element by means of two such grip members.

BRIEF DESCRIPTION OF THE DRAWINGS

In the following, preferred embodiments of the invention are described by means of examples and with references to the attached drawings, in which.

BRIEF DESCRIPTION OF PREFERRED EMBODIMENTS OF THE INVENTION

Figure 1:
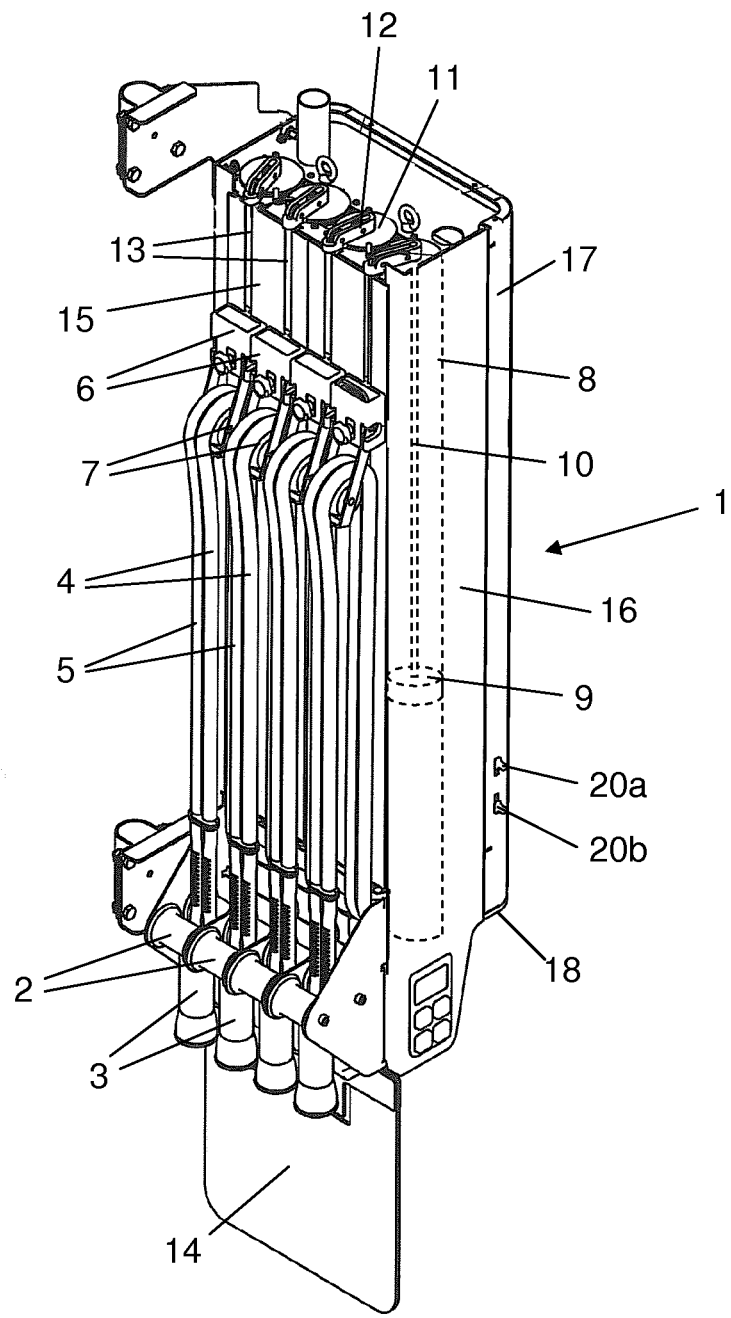
FIG. 1 shows a perspective view of a teat cup magazine according to the invention.

FIG. 1 shows a teat cup magazine 1. The teat cup magazine 1 is to be arranged in or in the vicinity of a milking stall in a milking parlour for cows. The teat cup magazine 1 comprises four stationary arranged rolling elements 2, each defining a storing position for a teat cup 3 in the teat cup magazine 1. The storing positions of the teat cups 3 are located in a row at a lower end portion of the teat cup magazine 1. Each teat cup 3 is connected to a milk tube 4 and a pulse tube 5. The milk tube 4 and the pulse tube 5 are supported by a movably arranged guiding element 6. Each guiding element 6 comprises a rolling member 7 to be in contact with the milk tube 4 and the pulse tube 5. The milk tube 4 and the pulse tube 5 have a substantially vertical extension between the stationary arranged rolling elements 2 and the movably arranged rolling member 7. The rolling members 7 define the highest position of the milk tubes 4 and the pulse tubes 5 in the teat cup magazine 1. When a guiding element 6 is located at an uppermost end position, it holds the teat cup 3 in the storing position in the teat cup magazine 1. When a movable guiding element 6 is displaced to a lower position in the magazine 1, the milk tube 4 and the pulse tube 5 are released to a length corresponding to the vertical position of the movable guiding element 6.

Preferably, the teat cups 3 are attached to the teats of a cow by means of a not visible robot arm. The robot arm fetches the teat cups 3 from the storing positions in the teat cup magazine 1 and moves them to the teats of the cow. The milking process starts as soon as a teat cup 3 has been attached to a teat. When a milking process is finished, the teat cups 3 are individually retracted to the storing positions in the teat cup magazine 1 by means of a respective removing device. Each removing device comprises a cylinder 8 and a piston 9 movably arranged inside the cylinder 8. Each piston 9 is connected to a guiding element 6 by means of an elongated flexible element 10, such as a cord or the like. The elongated flexible element 10 has an extension inside the cylinder from the piston 9 to a cover element 11 at an upper end of the cylinder 8. The cover element 11 comprises a guiding member 12 leading the elongated flexible element to a position outside the cylinder 8. The elongated flexible element has a substantially vertical extension downwardly from the guiding member 12 to the guiding element 6. The teat cup magazine 1 comprises a guiding track 13 for each guiding element 6.

When the milking process of a teat is finished, a vacuum pressure is applied to a part of the cylinder 8 below the piston 9. The applied vacuum pressure moves the piston 9 downwardly in the cylinder 8. The piston 9 provides a pulling motion in the flexible element 10 moving the guiding element 6 upwardly. The upward motion of the guiding element 6 provides a pulling motion in the milk tube 4 and in the pulse tube 5 which removes the teat cup 3 from the teat and retracts the teat cup 3 to the storing position in the teat cup magazine 1. The lower portion of the teat cup magazine 1 is provided with a stop element 14 of, for example, a rubber material, arranged to stop the motion of the teat cup 3 when is comes loose from the teat.

The teat cup magazine 1 comprises an inner space. The inner space of the teat cup magazine 1 is defined by a front wall 15 including the guiding tracks 13, two side wall elements 16 and a rear wall element in the form of an openable door element 17. The inner space of the teat cup magazine 1 is further defined by a bottom wall element 18 and an upper wall element 19. The upper wall element 19 is not visible in FIG. 1. The cylinders 8 of the removing devices are mounted in a front portion of the inner space of the teat cup magazine 1. The door element 17 comprises two pairs of grip members 20a-d arranged on opposite sides of the door element 17. The grip members 20a-d are used when the door element 17 is to be opened or removed from the teat cup magazine 1.

Figure 2:
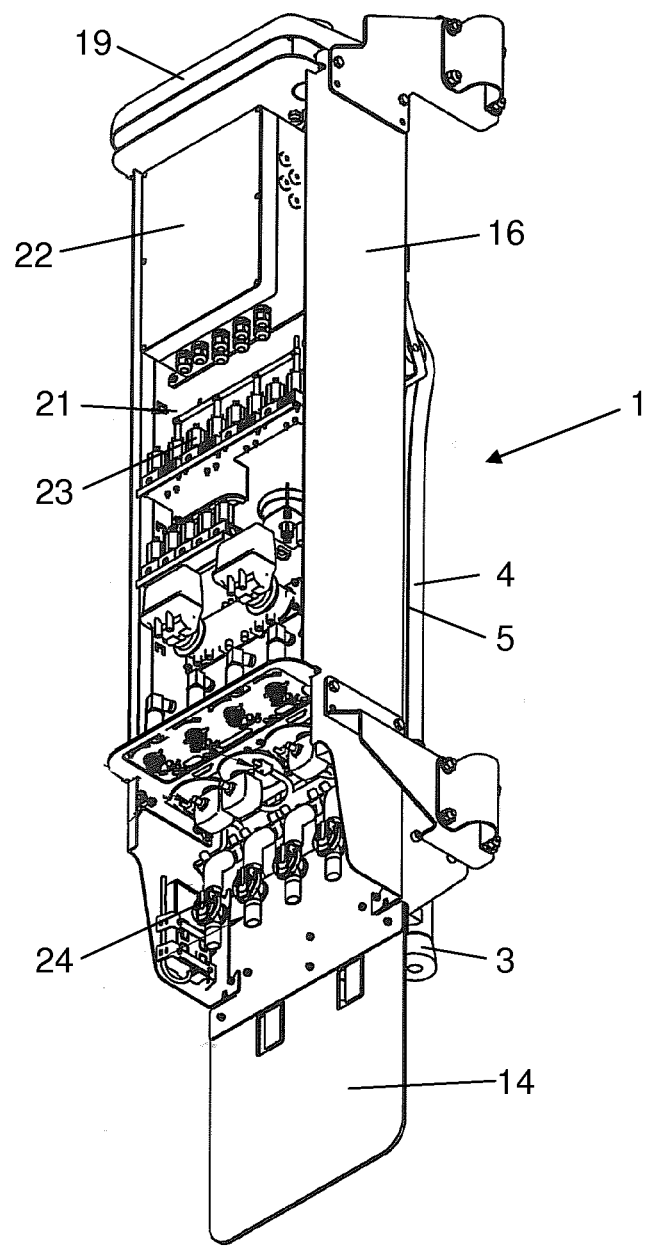
FIG. 2 shows a perspective view of a rear portion of the teat cup magazine.

FIG. 2 shows a rear side of the teat cup magazine 1 when the door element 17 has been removed. A rear portion of the inner space of the teat cup magazine 1 is here shown. The upper wall element 19 is here visible but not the bottom wall element 18. An inner wall element 21 divides the inner space into a front portion and a rear portion. A plurality of milking components are mounted in the rear portion of the inner space of the teat cup magazine 1. The milking components in the rear portion of the inner space are, for example, an electric control unit 22 controlling the removing devices, vacuum valves 23 controlling the vacuum pressure applied to the teat cups 3, and milk meters 24 measuring the milk flow from the respective teat cups 3. The milking components in the inner space of the teat cup magazine 1 require a protected environment.

Figure 3:
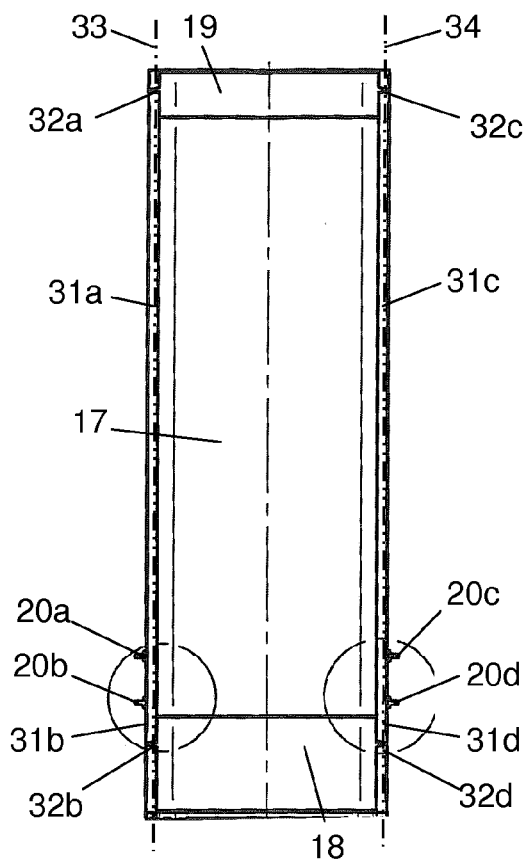
FIG. 3 shows an openable door element of the teat cup magazine.
Figures 4, 5:
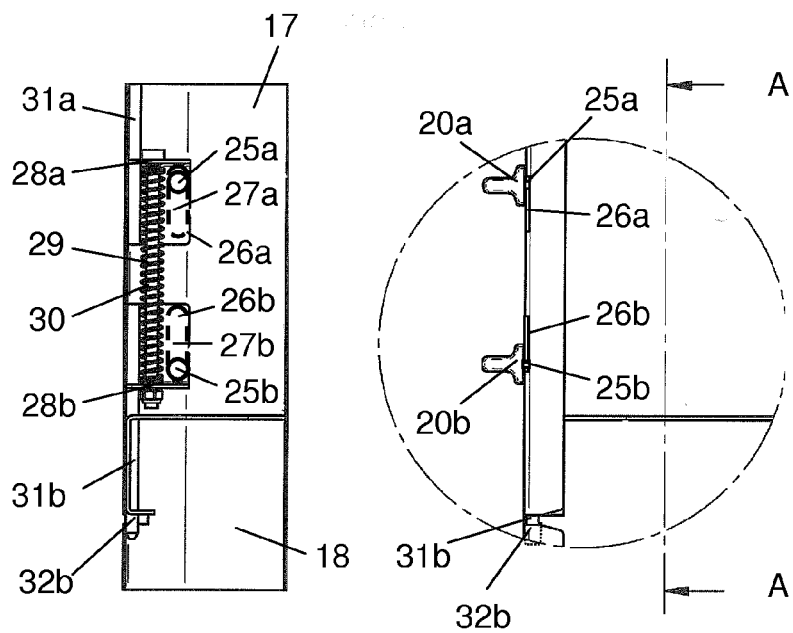
FIG. 4 shows an enlarged portion of two grip members in FIG. 3.
FIG. 5 shows a view along the plane A-A in FIG. 4.

FIG. 3-5 shows the door element 17 from the outside. Two grip members 20a, 20b are arranged on the left side of the door element 17 and two grip members 20c, 20d are arranged on the right side of the door element 17. The grip members 20a-d are mounted closer to the bottom wall element 19 than to the upper wall element 19, since the teat cup magazine 1 many times is mounted high above the ground surface. FIG. 4 shows the left grip members 20a, 20b more in detail. Each grip member 20a, 20b is mounted on an outer end of a pin element 25a, 25b. The pin elements 25a, 25b have an extension through a respective elongated opening 26a, 26b in the door element 17. Each pin element 25a, 25b is at an inner end connected to a respective plate-shaped member 27a, 27b on the inside of the door element 17. The plate-shaped members 27a, 27b have extensions such that they cover the elongated holes 26a, 26b in the door element 17 at least when the door element 17 is arranged in a locking position in the teat cup magazine 1. This helps keep the dirt out of the cabinet. The plate shaped-members 27a, 27b have an angled portion 28a, 28b. The angled portions 28a, 28b are connected by means of a bolt member 29. A spring member 30 acts with a resilient force on the angled portions 28a, 28b in order to displace the plate-shaped members 27a, 27b and the connected grip members 20a, 20b to locking positions at which they are at a maximum distance from each other. The grip members 20a, 20b are in the locking positions arranged at a distance of for example 5 to 10 cm from each other.

The upper plate-shaped member 27a is connected to an upper rod element 31a. The upper rod element 31a has an extension from the angled portion 28a of the upper plate shaped element 27a to a free end portion located in the vicinity of a hole 32a in the upper wall element 19 or in an element connected to the upper wall element 19. When the spring member 29 moves the angled portion 28a to the locking position, the free end portion of the upper rod element 31a will be moved into the hole 32a. The angled portion 28b of the lower plate-shaped member 27b is connected to a lower rod element 30b. The lower rod element 30b has a free end portion located at the vicinity of a hole 32b in the bottom wall element 18 or in an element connected to the bottom wall element 18. When the spring member 29 moves the angled portion 28b to the locking position, the free end portion of the lower rod element 31b will be moved into the hole 32b. The rod elements 31a, 31b are concentrically arranged. When the upper rod element 31a is in engagement with the hole 32a and the lower rod element 31b is in engagement with the hole 32b, a first pivoting mechanism is formed defining a first pivot axis 33 for the door element 17. On the right side of the door element 17, a corresponding second pivoting mechanism is formed defining a second pivot axis 34 for the door element 17. The second pivoting mechanism is formed by means of the corresponding rod elements 31c, d and holes 32c, d on the opposite side of the door element 17.

During installation, repair or servicing of milking components 22, 23, 24 in the inner space of the teat cup magazine 1, it is necessary to open or remove the door element 17. In milking stalls there are many times a lot of components in the vicinity of the teat cup magazine 1. In certain cases, it could be difficult to move the door element 17 to an open position on the left side or right side of the teat cup magazine 1. The above mentioned attachment of the door element 17 in the teat cup magazine 1 makes it is possible to open or remove the door element 17 in several manners. In case the door element 17 is not swingable to a position on the left side of the teat cup magazine 1, an operator grips the grip members 20a, 20b on the left side of the door element 17 with one hand and presses them towards each other with the thumb and the forefinger. The grip members 20a, 20b displace the plate-shaped members 27a, 27b together against the action of the spring member 30. The angled portion 28a of the upper plate-shaped member 27a displaces the upper rod element 30a downwardly and out of engagement with the upper hole 31a. The angled portion 28b of the lower plate-shaped member 27b displaces the lower rod element 30b upwardly and out of engagement with the lower hole 31b. As soon as the rod elements 31a, 31b have been moved out of engagement with the holes 32a, 32b, the left edge portion of the door element 17 is free to move from the left edge side wall element 16 of the teat cup magazine 1. The door element 17 is now free to swing around the second pivot axis 34 from a closed position to an open position on the right side of the teat cup magazine 1.

In case it is impossible to move the door to a position on the right side of the teat cup magazine 1, the operator grips instead the grip members 20c, 20d on the right side of the door element 17 with one hand and presses them towards each other with the thumb and the forefinger. The grip members 20c, 20d displace corresponding rod elements 31c, 31d out of engagement with the holes 32c, 32d in the upper wall element 19 and in the bottom wall element 18. Thereby, the right edge portion of the door element 17 is free to move from the right side wall element 16 of the teat cup magazine 1. The door element 17 is now free to swing around the first pivot axis 33 from a closed position to an open position on the left side of the teat cup magazine 1.

In case it is impossible to move the door to a position either on the left side or on the right side of the teat cup magazine 1, the operator grips simultaneously the grip members 20a, 20b on the left side of the door element 17 with the left hand and the grip members 20c, 20d on the right side of the door element 17 with the right hand. The operator presses the pairs of grip members 20a-d together such that both the left edge portion of the door element 17 and the right edge portion of the door element are loosen. The door element 17 is now free to be removed from the teat cup magazine 1.

After installation, repair or servicing of milking components 22, 23, 24 in the teat cup magazine, the door element 17 is to be moved back to the closed position. In case the door element 17 has been swinged to an open position around one of the pivot axis 33, 34, the operator presses the pair of grip members 20a-d on the free side of the door element 17 together and swings the door element 17 back to the closed position. The operator releases the grip of the grip members 20a-d when the door element has been placed in the closed position. The spring member 30 displaces now the rod elements 31a-d back to their locking positions in the holes 32a-d. In case both sides of the door element 17 has been removed from the teat cup magazine 1, the operator grips and presses the grip members 20a-d on both sides of the door element together at the same time as the door element 17 is moved back to the closed position on the teat cup magazine 1. The operator releases the grip of the grip members 20a-d when the door element is in the closed position. The spring members 30 displace then the rod elements 31a-d to the locking position in the holes 32a-d on both sides of the door element 17. The above mentioned attachment of the door element 17 in the teat cup magazine 1 makes it very easy to mount and dismount the door element 17 in during installation, repair or servicing of milking components 22, 23, 24 in the teat cup magazine 1.

Figure 6:
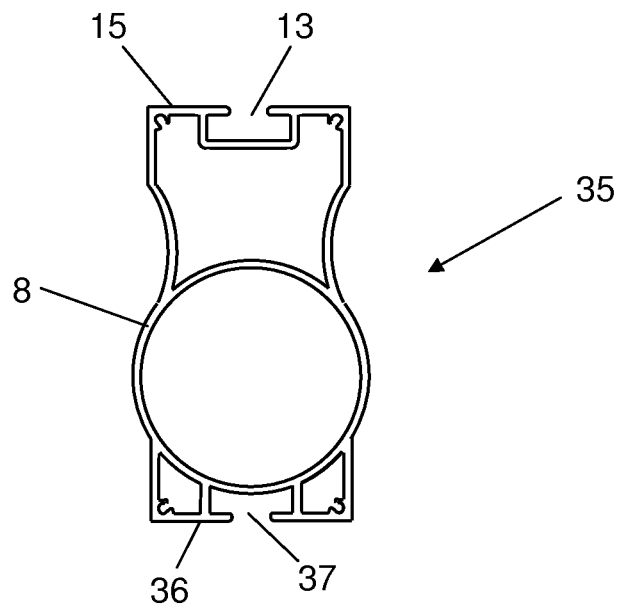
FIG. 6 shows a self-supporting cylinder profile of the teat cup magazine.

The teat cup magazine 1 further comprises removing devices including cylinders 8. The cylinders 8 have substantially an extension from the bottom wall element 18 to the upper wall element 19 in the teat cup magazine 1. FIG. 6 shows a cylinder profile 35 manufactured in one piece. The cylinder profile 35 is manufactured by means of an extrusion process. The cylinder profile 35 may be manufactured by a material such as aluminium. Extrusion is a process used to create objects of a fixed cross-sectional profile. The advantage of this process is the ability to create products with very complex cross-sections and an excellent surface finish. Furthermore, extruded objects may be produced at a relatively low cost. An elongated product of a desired cross-sectional profile may be extruded whereafter the product is cut in suitable lengths.

The cylinder profile 35 comprises a cylinder 8 used in the teat cup magazine 1. Furthermore, the cylinder profile 35 comprises parts forming the front wall 15 of the teat cup magazine 1 and the guiding tracks 13 of the guiding elements 6. The cylinder profile 35 comprises on the opposite side a wall 36 and integrated attachment zones comprising attaching members 37 for attachment of the inner wall element 21 which divides the inner space of the teat cup magazine 1 into a front portion and a rear portion. In this case, the teat cup magazine 1 comprises four such cylinder profiles 35 mounted side by side. These four cylinder profiles 35 have a very good strength. The cylinder profiles 35 are used as the sole load-bearing structure in the teat cup magazine 1. Consequently, the remaining parts of the teat cup magazine 1, such as for example the wall elements, may have less strength.

Figure 7:
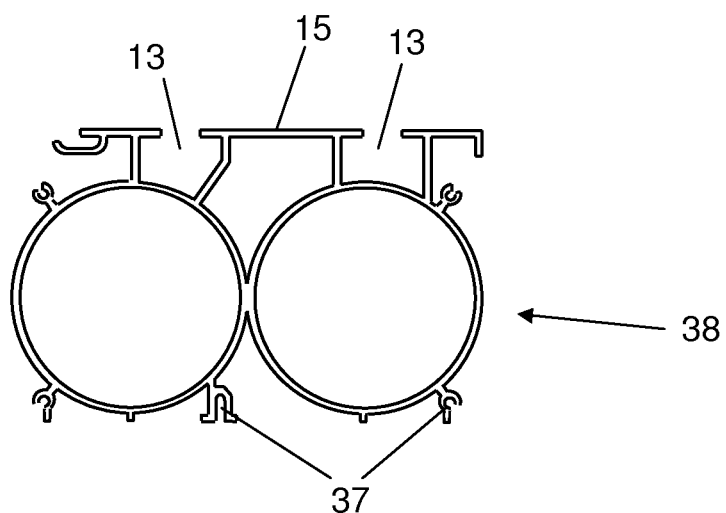
FIG. 7 shows an alternative embodiment of a self-supporting cylinder profile of the teat cup magazine and FIG. 8 shows a further alternative embodiment of a self-supporting cylinder profile of the teat cup magazine.

FIG. 7 shows an alternative cylinder profile 38 including two cylinders 8. Two such cylinder profiles can be mounted side by side in a teat cup magazine 1. Also in this case, the cylinder profile 38 comprises a front wall 15 of the teat cup magazine 1 and guiding tracks 13 for the guiding elements 6. The cylinder profile 35 comprises on the opposite side a number of attaching members 37 for attachment of different components. In this case, the two cylinder profiles 38 form the load-bearing structure of the teat cup magazine 1.

Figure 8:
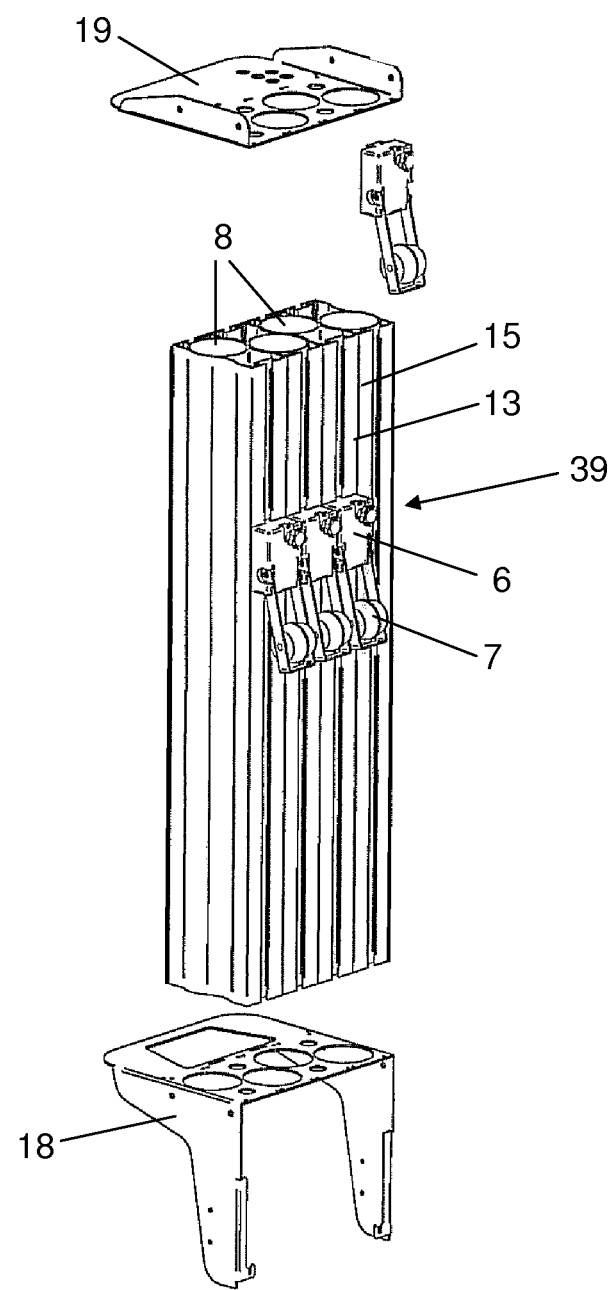

FIG. 8 shows a further alternative cylinder profile 39. In this case, the cylinder profile 39 comprises all four cylinders 8 in the teat cup magazine. The cylinders 8 are mounted in a zig-zag pattern in order to minimize the width of the cylinder profile 39 and thereby the width of the teat cup magazine 1. An upper part of the cylinder profile 39 is connected to an upper wall element 19 and a lower part of the cylinder profile 39 is connected to a bottom wall element 18. This cylinder profile 39 forms the load-bearing structure of the teat cup magazine 1.

The invention is not limited to the described embodiments but may be varied and modified freely within the scope of the claims.

The invention claimed is:

1. A teat cup magazine (1) arranged to store at least two teat cups (3) when the teat cups (3) are not used, comprising:
   a removing device for each teat cup (3), each removing device arranged to retract each teat cup (3) into the teat cup magazine when a milking process has finished,
   wherein each removing device comprises a piston (9) movably arranged inside a corresponding cylinder (8) of at least two cylinders,
   wherein each cylinder (8) comprises a first upper end and an opposite second lower end, and is formed from a cylinder profile (35, 38, 39), the cylinder profile is a one-piece manufactured element, and the cylinder profile constitutes a sole load-bearing structure of the teat cup magazine,
   wherein the cylinder profile (35, 38, 39) comprises i) on a first side of a circumference of the cylinder, an integrated attachment zone (37) with a milking component attached thereto, and ii) on an opposite second side of the circumference of the cylinder, a guiding track (13), wherein the guiding track (13) extends along at least a part of a length of the corresponding cylinder (8) from the upper end to the bottom end of the cylinder (8);
   a movable guiding element (6) supporting a milk tube (4) and a pulse tube (5) connected to a corresponding one of the teat cups, the movable guiding element (6) movably arranged in the guiding track (13) of a corresponding one of the cylinders (8); and
   an elongated element (10) that connects the piston (9) to the movable guiding element (6), the elongated element (10) extending from the piston (9) upward inside the cylinder (8) to an upper end of the cylinder (8) and downward to the movable guiding element (6),
   wherein the milking component is one of the group consisting of an electric component, a valve, and a measuring equipment used in connection with milking processes.

2. A teat cup magazine (1) according to claim 1, wherein the guiding track (13) extends along a whole length of the corresponding cylinder (8) from the first upper end to the second lower end of the cylinder (8).

3. A teat cup magazine (1) according to claim 2, wherein the cylinder profile (35, 38, 39) comprises one of i) one cylinder (8), ii) two cylinders (8), and iii) four cylinders (8).

4. A teat cup magazine (1) according to claim 3, further comprising a cabinet attached to the integrated attachment zone (37) of the cylinder profile (35, 38, 39).

5. A teat cup magazine (1) according to claim 4, wherein the cabinet comprises:
   an inner space accommodating the milking component (22-24) attached to the attachment zone (37) of the cylinder profile (35, 38, 39),
   a door element (17), arranged to close the inner space in an openable manner,
   a first pivoting mechanism (31a, 31b, 32a, 32b), allowing the door element (17) to swing around a first pivoting axis (33) when the door is moved from the closed position,
   a second pivoting mechanism (31c, 31d, 32c, 32d), allowing the door element (17) to swing around a second pivot axis (34) when the door is moved from the closed position, and
   an opening mechanism, arranged to disconnect at least one of said first and second pivoting mechanisms (31a-d, 32a-d) when the door element (17) is to be moved from the closed position.

6. A teat cup magazine (1) according to claim 5, wherein said opening mechanism comprises i) a first grip member (20a, 20b), allowing disconnection of the first pivoting mechanism (31a, 31b, 32a, 32b), and ii) a second grip member (20c, 20d), allowing disconnection of the second pivoting mechanism.

7. A teat cup magazine (1) according to claim 5, wherein the first pivoting mechanism (31a, 31b, 32a, 32b) and the second pivoting mechanism (31c, 31d, 32c, 32) are arranged so that the first pivot axis (33) and the second pivot axis (34) are parallel.

8. A teat cup magazine (1) according to claim 5, wherein the first pivoting mechanism and the second pivoting mechanism are arranged at two edge portions of the door element (17) allowing the door element (17) to swing around the first pivot axis (33) at a first edge portion and around the second pivot axis (33) at a second edge portion.

9. A teat cup magazine (1) according to claim 5, wherein, at least one of said first and second pivoting mechanisms (31*a-d*, 32*a-d*) comprises i) two concentrically arranged rod elements (31*a-d*) connected to the door element (17), and ii) two concentrically arranged holes (32*a-d*) in stationary parts of the cabinet (1), each hole (32*a-d*) arranged to receive an end portion of the respective rod elements (31*a-d*).

10. A teat cup magazine (1) according to claim 9, wherein said at least one pivoting mechanism (31*a-d*, 32*a-d*) comprises a resilient element (30) arranged to displace said rod elements (31*a-d*) into engagement with the respective holes (32*a-d*) by a resilient force.

11. A teat cup magazine (1) according to claim 10, wherein said opening mechanism comprises a grip member (20*a-d*) for each rod element (31*a-d*) to allow displacement of the respective rod elements (31*a-d*) out of engagement with the holes (32*a-d*) against the action of the resilient element.

12. A teat cup magazine (1) according to claim 11, wherein,
the rod elements (31*a-d*) are displaceably arranged on an inside of the door element (17), and
each grip member (20*a-d*) is connected to a respective rod element (31*a-d*) by a pin element (25*a*, 25*b*) having an extension through an opening (26*a-d*) in the door element (17).

13. A teat cup magazine (1) according to claim 12, wherein the opening (26*a*, 26*b*) in the door element (17) has an elongated design in a direction to allow displacement of the two grip members (20*a*, 20*b*) towards each other in order to move the respective rod elements (31*a*, 31*b*) out of engagement with the holes (32*a*, 32*b*).

14. A teat cup magazine (1) according to claim 13, wherein the two grip members (20*a*, 20*b*) are arranged at a smaller distance than 15 cm from each other when the rod elements (31*a*, 31*b*) are in engagement with the respective holes (32*a*, 32*b*).

15. A teat cup magazine (1) according to claim 13, wherein the two grip members (20*a*, 20*b*) are arranged at a distance of 5 to 10 cm from each other, when the rod elements (31*a*, 31*b*) are in engagement with the respective holes (32*a*, 32*b*).

16. A teat cup magazine (1) arranged to store at least two teat cups (3) when the teat cups (3) are not used, comprising:
a cabinet;
at least one cylinder profile (35, 38, 39), each cylinder profile (35, 38, 39) comprising i) a cylinder, ii) on a first side of a circumference of the cylinder, an integrated attachment zone (37) with a milking component attached thereto, and iii) on an opposite second side of the circumference of the cylinder, a guiding track (13), wherein each cylinder profile is a one-piece manufactured element, each cylinder having a bottom end and an opposite upper end, wherein the guiding track (13) extends along at least a part of a length of the corresponding cylinder (8) from the upper end to the bottom end of the cylinder (8); and
a removing device that retracts each teat cup (3) into the teat cup magazine when a milking process has finished,
wherein, for each teat cup, the removing device comprises
a piston (9) moveably arranged inside a corresponding cylinder (8) of the at least one cylinder profile (35, 38, 39);
a movable guiding element (6) supporting a milk tube (4) and a pulse tube (5) connected to a corresponding one of the teat cups, the movable guiding element (6) movably arranged in the guiding track (13) of the corresponding cylinder (8) of the at least one cylinder profile (35, 38, 39); and
an elongated element (10) that connects the piston (9) to the movable guiding element (6), the elongated element (10) extending from the piston (9) upward inside the cylinder (8) to an upper end of the cylinder (8) and downward to the movable guiding element (6),
the milking component being one of the group consisting of an electric component, a valve, and a measuring equipment used in connection with milking processes.

17. A teat cup magazine (1) according to claim 16, wherein the guiding track (13) extends along a whole length of the corresponding cylinder (8) from the bottom end to the upper end of the cylinder (8).

18. A teat cup magazine (1) that stores at least two teat cups (3) when the teat cups (3) are not used, comprising:
at least one cylinder profile (35, 38, 39), each cylinder profile being a one-piece manufactured element, the cylinder profile(s) constituting a sole load-bearing structure of the teat cup magazine, each cylinder profile (35, 38, 39) comprising i) at least one cylinder, ii) on a first side of a circumference of each cylinder, an integrated attachment zone (37) with a milking component attached thereto, and iii) on an opposite second side of the circumference of each cylinder, a guiding track (13), there being one cylinder for each of the at least two teat cups (3), each cylinder having an upper end and an opposite, lower end, wherein each guiding track (13) extends along at least a part of a length of the corresponding cylinder (8) from the upper end to the lower end of the cylinder (8); and
a removing device for each of the at least two teat cups (3), each removing device arranged to retract each corresponding teat cup (3) into the teat cup magazine when a milking process has finished,
wherein each removing device comprises i) a piston (9) movably arranged inside a corresponding one of the cylinders (8), ii) a movable guiding element (6) supporting a milk tube (4) and a pulse tube (5) connected to a corresponding one of the teat cups, the movable guiding element (6) movably located in the guiding track (13) of the corresponding one of the cylinders (8), and iii) an elongated element (10) connecting the piston (9) to the movable guiding element (6), the elongated element (10) extending from the piston (9) upward inside the cylinder (8) to the upper end of the cylinder (8) and then downward to the movable guiding element (6),
wherein the milking component is one of the group consisting of an electric component, a valve, and a measuring equipment used in connection with milking processes.

19. The teat cup magazine (1) according to claim 18, wherein,
the at least one cylinder profile (35, 38, 39) comprises two cylinders (8), and
the teat cup magazine (1) further comprises a cabinet attached to the integrated attachment zones (37) of the at least one cylinder profile (35, 38, 39).

20. The teat cup magazine (1) according to claim 18, wherein,
the at least one cylinder profile (35, 38, 39) comprises four cylinders (8), and
the teat cup magazine (1) further comprises a cabinet attached to the integrated attachment zones (37) of the at least one cylinder profile (35, 38, 39).

* * * * *